United States Patent Office 2,771,103
Patented Nov. 20, 1956

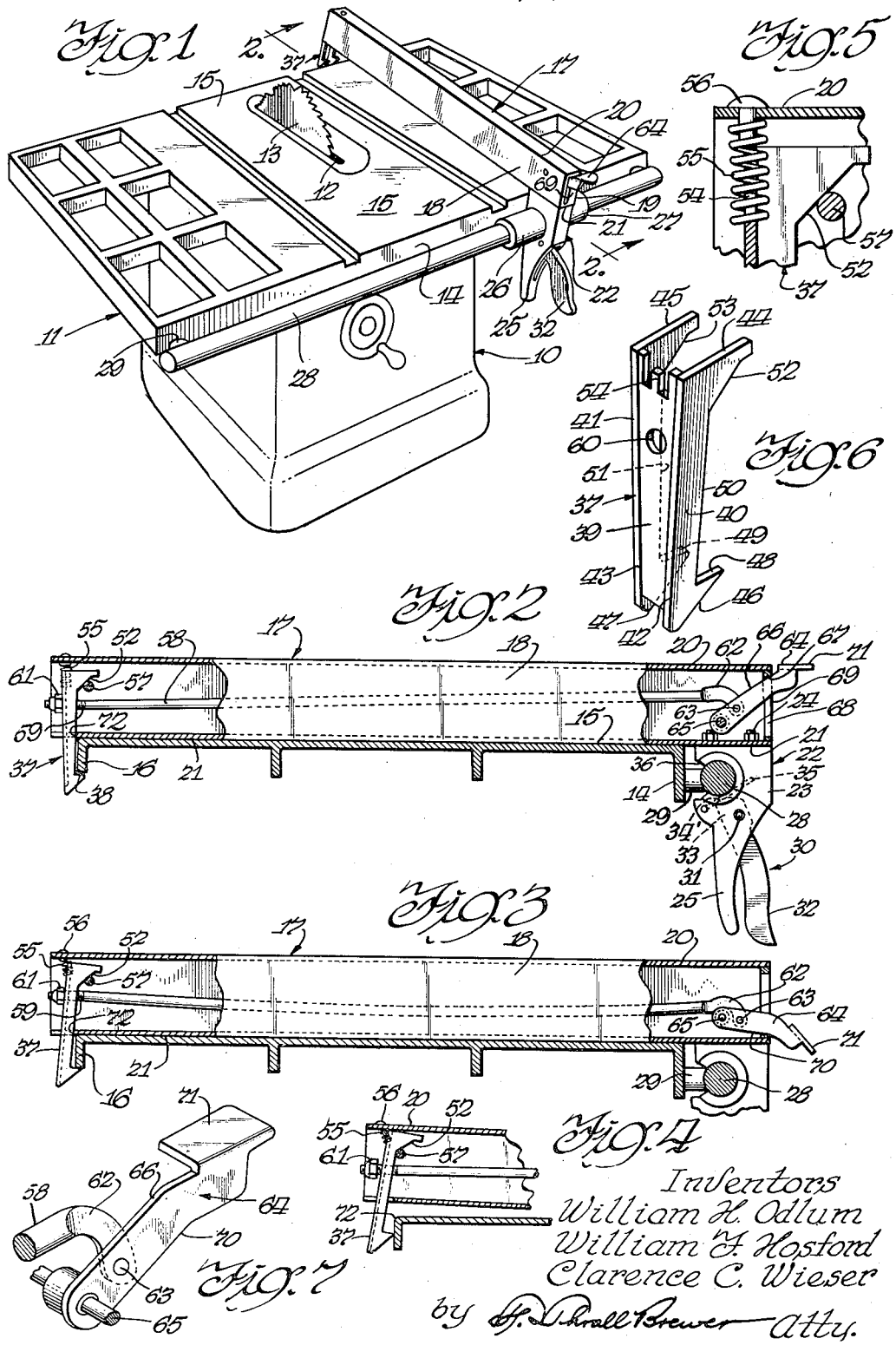

2,771,103

FENCE FOR THE WORK-SUPPORTING TABLE OF A POWER TOOL

William H. Odlum, Wilmette, and William F. Hosford and Clarence C. Wieser, Chicago, Ill., assignors to Duro Metal Products Co., Chicago, Ill., a corporation of Illinois Application February 23, 1954, Serial No. 411,796

3 Claims. (Cl. 143—174)

Our invention relates to power tools which are normally equipped with a work supporting table, and particularly to a fence for the work supporting table of such tools.

For purposes of illustration this invention is shown and described with reference to its application to a bench-type circular power saw having a work supporting table, although it is understood that it may be utilized with equal facility on a jointer planer or any tool on which a workpiece is moved along a table and requires a guiding surface.

When a workpiece, such as wood, is to be cut lengthwise on a circular power saw or the like, it is important that the wood shall be advanced toward and with reference to the saw along a line which is parallel to the plane of the saw blade. To assist the operator in advancing the workpiece in this manner, a fence is provided on the surface of the work table, the fence comprising a member having a flat guiding surface and being mounted on a guide bar for movement to adjusted positions in a direction lateral to the guiding surface. The fence usually extends from the front of the table to the rear thereof, and is supported and guided at the front region of the table for movement sidewise along the table.

It has been found that when the guide bar for the fence is made with normal tolerances, there may be sufficient play in the guide structure to allow the fence to assume a position which is not quite parallel to the plane of the saw blade. It has also been found that even when the fence is supported only at one end by the guide bar, it is possible, even though the fence is initially set at a correct position, inadvertently to force movement of the fence out of its correct position. This may occur partly because of the play in the guide structure and partly because of the resilience in the fence itself. To prevent such forced movement, it has been proposed to clamp the unsupported end of the fence to the rear of the table after the fence has been moved to the desired position on the table.

A rear clamp heretofore proposed has been one in the form of a hook attached to the rear portion of the fence and adapted to engage the rear flange of the table. It is drawn tightly against the flange by a screw portion on the end of the hook which passes through the top of the fence and has a nut disposed on the outside of the fence. The screw-and-nut form of tightening means, however, has been found to be awkward to reach and operate, and furthermore, there is no assurance that during the tightening of such rear clamp, the rear portion of the fence will not move slightly out of its desired position of parallelism with the plane of a saw blade.

It is an object of this invention to provide a clamping means for the rear portion of the fence of a power tool, which clamping means is simply and quickly operated and which may be controlled from the front part of the fence.

A more specific object of this invention is to provide a clamp for the rear portion of a fence for a power tool, wherein the clamp is operated by a spring-pressed cam locked in place by an over-center device.

This invention has for another object the provision of a clamp for the rear portion of the fence of a power tool which may be attached to the table of the power tool by a downward movement of the fence which automatically latches that portion of the fence in place when the fence is installed on the power tool.

As another object this invention seeks to provide a clamping means for the rear portion of a fence for power tools which may be controlled independently of the clamping means for the front portion of the fence, so that the fence may be moved to its desired position on the work table, then clamped in that position at its front portion and finally clamped at its rear end region to the table by the simple operation of a lever mounted at the front end of the fence.

These and other objects of this invention will become apparent from the following description when taken together with the accompanying drawings in which:

Fig. 1 is a perspective view of a bench-type power saw upon which is mounted a fence incorporating the rear clamping means of this invention;

Fig. 2 is a side elevational view, partly in section, of the fence of Fig. 1 and a portion of the table to which the fence is applied, the fence being shown on a larger scale than in Fig. 1;

Fig. 3 is a side elevational view of the fence and table, similar to Fig. 2, but showing the rear clamping means of this invention in a different position than that depicted in Fig. 2;

Fig. 4 is a fragmentary side elevational view of the rear portion of the fence of Figs. 1 and 2 and showing the clamping means for the fence as it is about to be attached to a table by a downward movement of the fence;

Fig. 5 is an enlarged fragmentary side elevational view depicting a resilient anchoring structure for the clamping means shown in Figs. 1 to 4 inclusive;

Fig. 6 is an enlarged perspective view of the hook used in the illustrated clamping means for the rear of the fence; and Fig. 7 is an enlarged perspective view of the control lever for the illustrated clamping means of this invention.

Referring now to the drawings for a detailed description of a preferred form of the invention, there is shown in Fig. 1 a power tool having a base 10 on which is mounted a table 11 for supporting work to be operated upon by the power tool, said table having an opening 12 through which extends a power driven circular saw blade 13. Table 11, in the disclosed structure, is a casting having rigidity and which has thereon an integral front flange 14 disposed substantially at a right angle to a top surface 15 and extending across the entire front of the table. A rear flange 16, shown in Figs. 2 and 3, is also integral with table 11, and extends across the entire rear of table 11 in a direction parallel with flange 14 and at a right angle to surface 15.

The work to be cut is guided in its movement toward blade 13 by a fence 17 which, in the present instance, embodies a section of rectangular tubing having sides 18 and 19 and a top 20 and a bottom 21. Sides 18 and 19 are disposed substantially at right angles to the top surface 15 of table 11. The length of fence 17 from front to rear of table 11 is such that it overhangs both front flange 14 and rear flange 16.

The overhanging front portion of fence 17 is secured to a guide 22 which is an integral structural element including a vertically disposed channel portion 23 immediately adjacent bottom surface 21 of fence 17 and a depending grip 25 extending below channel portion 23 and which guide is secured to the bottom surface of the fence by suitable threaded fasteners 24.

Extending laterally from the sides of channel portion 23 of the guide are cylindrical guide bearings 26 and 27 by which the guide 22 is slidably mounted on a cylindrical guide bar 28 which extends across the front of table 11 and is secured thereto in spaced relation to the front flange 14 by posts 29 that are secured to both the flange 14 and the bar 28 at the opposite ends of said bar 28. Thus, fence 17 may be made to assume any one of a plurality of parallel positions over table 11 merely by sliding guide 22 on guide bar 28 to the desired position.

The location of fence 17 on guide bar 28 may be fixed by a clamp mounted on guide 22, which clamp embodies a lever 30 pivoted at 31 on guide 22 to provide a relatively long operating handle 32 disposed in front of grip 25 and movable toward and away from said grip, and a short arm 33, the end 34 of which is formed as a cam surface. The location of cam surface 34 relative to the outer surface of guide bar 28 varies in accordance with the angularity of lever 30 with respect to grip 25. A pivoted pressure transmitting plate 35 is interposed between the end 34 of lever 30 and bar 28 in the manner and for the purposes described and claimed in the co-pending application of William H. Odlum, William F. Hosford, and Clarence C. Wieser, entitled Clamping Device, filed December 7, 1953, Serial No. 396,685.

To lock the front region of fence 17 to bar 28, the operator merely pushes downward on handle 32 which causes the end 34 to approach and then clamp plate 35 against guide bar 28. The fence 17 is released by moving handle 32 in the opposite direction i. e. upwardly.

It may be observed that cylindrical guides 26 and 27 are cut out at their rear regions 36 to clear posts 29, so that the fence may be removed completely from bar 28, or conversely, assembled with respect thereto, by sliding the guides 26 and 27 laterally off guide bar 28.

Locking means is also provided for the rear end of fence 17 which comprises essentially a hook 37 mounted in fence 17 and adapted to engage the bottom edge 38 of rear flange 16 of the power tool table. The hook is shown in detail in Fig. 6, and is made as a unitary member, either stamped or cast, of generally channel shape in cross-section, so as to have a central web 39 and two sides 40 and 41. Back edges 42 and 43 of sides 40 and 41, respectively, are substantially straight as are also the upper end edges 44 and 45. Lower end edges 46 and 47 are disposed at an acute angle to back edges 42 and 43 to provide cam surfaces by which a latching action, hereinafter to be described, may be had. Edges 46 and 47 are connected by edges 48 and 49, disposed substantially at right angles to rear edges 42 and 43, to front edges 50 and 51 which are substantially parallel with rear edges 42 and 43 and which join at their upper ends obliquely disposed cam edges 52 and 53.

The upper end of web 39 is cut out to form a tongue 54 which functions to retain the lower end of a spring 55 (Fig. 5) compressed between web 39 and the top 20 of fence 17. The upper end of spring 55 is held by a pin 56 extending inwardly from top 20. Spring 55 is normally sufficiently in compression to exert a downward force on hook 37 at all times. The support for spring 55 is so disposed that hook 37 may assume an angular position relative to fence 17 and may in fact float relatively freely within the limits provided by the control mechanism for the hook within fence 17 hereinafter to be described.

As shown by reference to Figs. 5 and 6, cam surfaces 52 and 53 are disposed in proximity to a fixed pin 57 extending across the interior of fence 17 from side 18 to side 19.

Hook 37 is held in place in fence 17 by a rod 58 (Figs. 2, 3 and 6) having one end 59 threaded and passing through an opening 60 in hook 37. Opening 60 is slightly larger than the diameter of rod 58 to allow said rod to rock to a limited extent relative to hook 37. A nut 61 on threaded end 59 serves as an abutment for limiting movement of the hook in a rearward direction. The relative locations of edges 48 and 49 of hook 37, edge 38 of rear flange 16, cam edges 52 and 53 and transverse pin 57 are such that when rod 58 is pulled to the right as viewed in Figs. 2 and 3, cam edges 52 and 53 will ride on pin 57 and raise hook 37 relative to fence 17 until edges 48 and 49 abut on edge 38 of flange 16. Thus, if sufficient pressure is exerted upon rod 58 in the right hand direction as viewed in Figs. 2 and 3, hook 37 will cause fence 17 to be clamped against table 11 at the rear edge regions of said table.

Hook 37 is held away from the side of flange 16 by contact with the edge 72 of a slot in the bottom 21 of the fence which overhangs the rear edge of table 11 so that when the fence is in operative position on table 11, it may be moved sidewise across the table without in any way binding upon flange 16.

The clamping force for rod 58 is supplied by an over-center device disposed at the front end of fence 17. As shown in Figs. 2, 3 and 7, rod 58 has a curved end 62 and is fastened by a pin 63 to a lever 64 oscillatable about a pivot 65 extending from side 18 to side 19 of fence 17. The disposition of pivot 65, pin 63 and opening 60 in hook 37 relative to one another is such that when lever 64 is in its raised position, as shown in Fig. 2, pivot 65 is below a line drawn through pin 63 and the center of opening 60 in the hook and that when lever 64 is in its lower position, as shown in Fig. 3, pivot 65 is above a line drawn through the same two points. The length of rod 58 between pin 63 and hook 37 is adjusted by nut 61 and is so selected as to impress a slight tension in rod 58 when lever 64 is in its raised position. In such raised position, the top edge 66 of lever 64 engages the upper end 67 of a slot 68 in the end cover 69 of fence 17. When lever 64 is in its lower position, its bottom edge 70 contacts the lower end of said slot 68. For convenience in manipulating lever 64, the free end thereof is bent over to provide a thumb rest 71 against which the operator may exert pressure to effect a clamping action between hook 37 and flange 16.

Due to the slight tension existing in rod 58, the rotation of lever 64 in a downward or clockwise direction, as viewed in Fig. 3, is resiliently resisted, and the resistance increases as the lever rotates, due to the fact that such rotation tends to increase the distance between pin 63 and nut 61. When the over-center relation shown in Fig. 3 is reached, sufficient resilience remains in rod 58 to hold hook 37 in its raised or clamped position.

It may be observed that the operation of lever 64 is entirely independent of the operation of lever 30 for clamping fence 17 to guide bar 28. It is, therefore, possible to move fence 17 along guide bar 28 to a desired position, then to clamp the front end of fence 17 to guide bar 28 by the action of lever 30, while maintaining and securing the setting of the fence relative to table 11, and then to depress lever 64 to clamp the rear portion of fence 17 to flange 16, thereby to lock the fence in its established setting relative to table 11.

When fence 17 is assembled on guide bar 28, such assembly can be effected without regard to aligning hook 37 relative to flange 16 so that fence 17 may be slid along bar 28 to any position thereon with hook 37 raised above the top 15 of table 11. When the fence is approximately at the desired position, it is simply swung downwardly about bar 28 until hook 37 strikes the corner 72 (Fig. 4) of top 15, whereupon the sloping lower end edges 46 and 47 of the hook will cam the hook outwardly from the fence and allow the hook to ride down the rear face of flange 16 until transverse edges 48 and 49 are below edge 38 of flange 16. The location of pin 57, tongue 54 and pin 56 are such that spring 55 is under greater compression when hook 37 is raised and moved to the position shown in Fig. 4 than when hook 37 is in the position shown in Fig. 2 and hence spring 55, aided by the tension in rod 58, is effective to cause hook 37 to snap under edge 38 of flange 16 and to hold the hook there loosely until lever 64 is operated to effect a clamping action between the hook and flange 16.

It may be observed that since the rear end of rod 58 is supported only by hook 37, said end may therefore be raised or lowered to accommodate the movements of hook 37 without in any way affecting the functioning of the rod.

The clamping means for the rear of fence 17 described herein, being independent of the clamping means for the front end of fence 17, is not influenced in any way by the operation of the front end clamping means. With control lever 64 mounted at the front end of fence 17, the operation of the hook 37 is convenient, and the particular over-center arrangement used makes the clamping action rapid and certain. There being no threaded control member for the operation of the clamping means, the clamping force exerted by rod 58 is uniform and may be adjusted at the factory to provide adequate pressure for use. The latching action of hook 37 simplifies the assembly of fence 17 on bar 28 since it eliminates any need for simultaneously aligning front and rear guides with corresponding parts on the fence.

It is understood that the foregoing description is merely illustrative of a preferred embodiment of this invention and that its scope therefore is not to be limited thereto but is to be determined by the apended claims.

We claim:

1. A locking means for one end of a fence for a power tool having a flanged work-receiving table in proximity to the fence, said locking means comprising a clamping element having a hook at one end adapted to engage the free edge of the flange, a first cam surface on the element, a stationary follower for the cam disposed on the fence, resilient means for drawing the cam against the follower, the cam and follower being arranged to raise and hold the hook against the flange under the drawing action of the resilient means, means mounting said fence over the table for oscillatory movement toward and away from the top of the table and for movement substantially parallel to the edge of the table, and a second cam disposed on the outside of the hook to strike the edge of the table and to move the element out of the way of said table edge to permit the hook to pass around and latch against the free edge of the flange when the fence is oscillated toward the table.

2. A locking means as described in claim 1, the resilient means for drawing the cam against the follower comprising a rod loosely secured at one end to the element and extending longitudinally of the fence to the forward region thereof, the forward end of the rod being curved, a control lever mounted on the fence with its pivot disposed between the ends of the rod, means for limiting the oscillations of the lever, and pivoted means connecting the forward end of the rod and lever to provide an over-center connection therebetween.

3. A locking means as described in claim 1, the resilient means for drawing the cam against the follower comprising a rod loosely secured at one end to the element and extending longitudinally of the fence to the forward region thereof, the forward end of the rod being curved, a control lever mounted on the fence with its pivot disposed between the ends of the rod, said fence having a substantially flat forward surface disposed at right angles to the long axis of the fence, said surface having an opening therein through which the operative end of the lever extends and which limits the movement of the lever, and pivoted means connecting the forward end of the rod and lever to provide an over-center connection.

References Cited in the file of this patent

UNITED STATES PATENTS

| | | |
|---|---|---|
| 2,106,288 | Tautz | Jan. 25, 1938 |
| 2,140,323 | Lonskey | Dec. 13, 1938 |
| 2,166,703 | Boice | July 18, 1939 |
| 2,265,335 | Aumann | Dec. 9, 1941 |
| 2,325,082 | Tautz | July 27, 1943 |
| 2,374,286 | Hargadon | Apr. 24, 1945 |
| 2,562,246 | Van Dam et al. | July 31, 1951 |